(12) United States Patent
Van Dyke

(10) Patent No.: US 7,080,194 B1
(45) Date of Patent: Jul. 18, 2006

(54) METHOD AND SYSTEM FOR MEMORY ACCESS ARBITRATION FOR MINIMIZING READ/WRITE TURNAROUND PENALTIES

(75) Inventor: James M. Van Dyke, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 2 days.

(21) Appl. No.: 10/943,032

(22) Filed: Sep. 16, 2004

Related U.S. Application Data

(62) Division of application No. 10/074,066, filed on Feb. 12, 2002, now Pat. No. 6,829,689.

(51) Int. Cl.
*G06F 12/12* (2006.01)
*G06F 12/14* (2006.01)

(52) U.S. Cl. .................. 711/105; 711/167; 711/147; 710/40

(58) Field of Classification Search ................ 711/105, 711/133, 134, 135, 136, 167, 147, 154, 151; 710/40; 714/5, 6, 7, 8, 9
See application file for complete search history.

(56) References Cited

U.S. PATENT DOCUMENTS

| 6,112,265 | A | 8/2000 | Harriman et al. | |
|---|---|---|---|---|
| 6,622,224 | B1 | 9/2003 | Cloud | |
| 6,829,689 | B1 * | 12/2004 | Van Dyke | 711/167 |
| 2003/0140195 | A1 * | 7/2003 | Borkenhagen et al. | 711/118 |
| 2003/0177320 | A1 * | 9/2003 | Sah et al. | 711/158 |

OTHER PUBLICATIONS

Miyano, et al., "A 1.6 Gbyte/s Data Transfer Rate 8 Mb Embedded DRAM", © 1995 IEEE, p. 1281-1285.*

* cited by examiner

*Primary Examiner*—Brian R. Peugh
(74) *Attorney, Agent, or Firm*—Patterson & Sheridan, L.L.P.

(57) ABSTRACT

A method and system for arbitrating among memory access commands from clients seeking access to a DRAM or other memory, and an arbiter for use in implementing such method or system. When arbitrating among competing commands that include at least one command of the same read/write type as the current command, the arbiter selects a command of the same read/write type as the current command. In a wait mode, when arbitrating among a set of the commands that includes no command of the same read/write type as the current command, the arbiter prevents each command in the set from reaching the memory. Preferably, after operating in the wait mode for a limited time, the arbiter enters another arbitration mode in which it can select a command of the opposite read/write type as the current command. Preferably, the arbiter is implemented to be operable in any of multiple operating modes. For example, it can have separately programmable wait times for "read to write" and "write to read" situations. Preferably, the arbiter monitors for occurrence of potential page fault conditions.

40 Claims, 2 Drawing Sheets

METHOD AND SYSTEM FOR MEMORY ACCESS ARBITRATION FOR MINIMIZING READ/WRITE TURNAROUND PENALTIES

CROSS-REFERENCE TO A RELATED APPLICATION

This application is a divisional of U.S. application Ser. No. 10/074,066 now U.S. Pat. No. 6,829,689 filed Feb. 12, 2002 in the name of James N. Van Dyke and entitled "Method And System For Memory Access Arbitration For Minimizing Read/Write Turnaround Penalties".

TECHNICAL FIELD OF THE INVENTION

The present invention relates to methods for arbitrating read and write commands asserted to a DRAM and systems for performing such arbitration. More specifically, the invention relates to methods for arbitrating read and write commands asserted to a DRAM so as to reduce or minimize DRAM performance penalties resulting from transitions between read and write commands, and systems for performing such arbitration.

BACKGROUND OF THE INVENTION

Modern dynamic random access memories ("DRAMs"), including single data rate ("SDR") DRAMS, double data rate ("DDR") DRAMs, and RAMBUS DRAMs, are internally pipelined and often use either a pair of unidirectional data busses or a bidirectional data bus to transfer data during read operations (in which data are read from the DRAM over the bus) or write operations (in which data are written to the DRAM over the bus). The internal pipelining often imposes a performance loss when the DRAM transitions from a sequence of write operations to a sequence of read operations, or vice-versa. When a bi-directional data bus is used, a turnaround time penalty associated with this bus must be incurred to implement each transition from a read operation to a write operation, or from a write operation to a read operation. During each such transition, the bus must be tri-stated for a clock cycle while the previous driver of the data pins becomes tri-stated and the current driver of the data pins is enabled. This is a cycle in which no data may be transferred to or from the DRAM, and thus results in performance loss.

Conventionally, state machines inside a DRAM manage the addresses asserted to the DRAM's cell array during both reads and writes, the data read out of the cell array during each read operation, and the data written into the cell array during each write operation. When the cell array has been placed in a read state (a state in which it can execute a read command), a finite amount of time (a nonzero performance penalty) is required to place the cell array in a write state (a state in which it can execute a write command). When the cell array has been placed in a read state, it can execute a sequence of read commands without incurring such a performance penalty. Similarly, when the cell array has been placed in a write state, a finite amount of time (a nonzero performance penalty) is required to place the cell array in a read state. When the cell array has been placed in a write state, it can execute a sequence of write commands without incurring such a performance penalty.

A typical use for a DRAM is in a system that includes an arbiter and two or more client devices ("clients") that assert read and write commands (for the DRAM) to the arbiter. The arbiter is coupled between the clients and the DRAM and configured to apply one or more rules to determine which of contemporaneously asserted commands it will pass through to the DRAM.

We shall use the expression "read client" to denote a client whose most recently asserted command (to an arbiter) is a read command for a DRAM, the expression "write client" to denote a client whose most recently asserted command (to an arbiter) is a write command for a DRAM, the expression "current client" to denote the client whose command was most recently passed through to a DRAM by an arbiter, and the expression "current command" to denote the command most recently passed through to a DRAM by an arbiter.

We shall use the expression "set of commands" (and variations thereon) to denote one or more commands contemporaneously asserted to an arbiter, where each command in the set is asserted by a client. We shall use the expression "set of competing clients" (and variations thereon) to denote one or more clients that contemporaneously assert commands to an arbiter, where each client in the set asserts one command to the arbiter.

In order to reduce performance penalties associated with read-to-write or write-to-read transitions, it has been proposed that an arbiter (in a system of the above-mentioned type) be configured to recognize whether the current command is a read command or a write command (and thus to recognize whether the current client is a read client or a write client), and to choose the next client (whose command will be passed through to the DRAM by the arbiter) to be of the same read/write type as the current client. When two or more competing clients are of the same read/write type as the current client, the arbiter uses another criterion (or other criteria) to select the next client from among these competing clients. However, the arbiter cannot select (as the next client) a matching client (having the same read/write type as the current client) from among multiple clients (competing to be selected as the next client) when none of the competing clients is of the same read/write type as the current client. To select one of multiple competing clients as the next client (when none of them is of the same read/write type as the current client), conventional arbiters apply some other rule (or rule set) to select the next client as rapidly as is practical (and without delay).

However, the present inventors have recognized that DRAM systems (that include conventionally implemented arbiters of the described type) are subject to significant limitations. For example, they are incapable of significantly reducing performance penalties associated with read-to-write or write-to-read transitions when responding to many sequences of competing commands (e.g., a repeating sequence of multiple competing read commands followed by multiple competing write commands).

SUMMARY OF THE INVENTION

In a class of embodiments, the invention is a system including at least one DRAM, an arbiter coupled to the DRAM, and at least two clients coupled to assert read and write commands (for the DRAM) to the arbiter. The arbiter is operable to select among competing ones of the clients (by determining which one of contemporaneously asserted commands from the clients to pass through to the DRAM). When arbitrating among competing clients that include at least one client of the same read/write type as the current client, the arbiter selects (as the next client) one of the competing clients that is of the same read/write type as the current client. When arbitrating among a set of clients that includes no client of the same read/write type as the current client, the arbiter operates in a wait mode during a predetermined wait interval by selecting (as the next client) a client (if any) that asserts a command of the same read/write type as the current command. After the wait interval, the arbiter enters another arbitration mode in which a command of the opposite read/write type can be chosen. For example, if a first set of clients competes for access to the DRAM at a first time during the wait interval but none of these clients is selected during the wait interval, the arbiter applies a rule set (comprising at least one rule) to select as the next client one of a second set of the clients that are competing for access to the DRAM at a second time after the wait interval. The second set of competing clients can be identical to the first set of competing clients, or it can consist of the first set of competing clients and additional clients. Typically, the rule set requires that, if at least one of the clients in the second set is of the same read/write type as the current client, the arbiter selects as the next client one of the clients in the second set that is of the same read/write type as the current client, and that otherwise the arbiter selects as the next client one of the clients in the second set that is of the opposite read/write type as the current client. Typically, the wait interval is a predetermined, small number of clock cycles.

Other aspects of the invention are an arbiter for use in any embodiment of the inventive system, and a method for arbitrating among commands asserted by clients for access to a DRAM at a time when a current client has been selected. The method includes the steps of:

in response to a set of competing ones of the clients that includes at least one client of the same read/write type as the current client, selecting (as the next client) one of the clients in the set that is of the same read/write type as the current client; and in response to a set of competing ones of the clients that does not include any client of the same read/write type as the current client, operating in a wait mode during a wait interval having a predetermined duration and commencing at a first time, by selecting (as the next client) a client (if any) that asserts a command of the same read/write type as that of the current client, and at a second time after the wait interval, entering another arbitration mode in which a command of the opposite read/write type can be accepted. For example, at the second time (after the wait interval), if no command of the same read/write type as that of the current client has been asserted during the wait interval, a rule set (comprising at least one rule) can be applied to select as the next client one of a second set of the clients that are competing for access to the DRAM at said second time. Typically, the wait interval is a predetermined, small number of clock cycles.

In accordance with the invention, an arbiter operates with the goal of granting DRAM access requests from clients such that the resulting sequence of granted requests (and the corresponding sequence of read and/or write commands passed through by the arbiter to the DRAM) contains a minimum of "read to write" and "write to read" crossovers in order to minimize performance penalties associated with such crossovers. Granted read requests and write requests are grouped with their own kind as much as possible. Rather than selecting the next client from a set of competing clients whose read/write type does not match that of the current client (a set of "non-matching" clients), the arbiter waits for at least a predetermined time (e.g., a predetermined number of clock cycles) before granting an access request of the wrong type (one that would result in a "read to write" or "write to read" crossover). This allows time for a client whose read/write type matches that of the current client (a "matching" client) to become active and be selected immediately, thus avoiding a read/write turnaround penalty that would otherwise be incurred.

If the predetermined wait time is too long, the DRAM may be inactive for an undesirably long time if no matching client becomes active soon after the start of the wait period. This can result in a performance penalty greater than the read/write turnaround penalty. If the predetermined wait time is not long enough, an opportunity can be missed in which a matching client becomes active just after (e.g., on the next clock after) the wait interval ends and a non-matching client is selected as the next client (resulting in a read/write turnaround penalty). For these reasons, the predetermined wait time is preferably equal (or substantially equal) to the system's "read to write" transition performance penalty or "write to read" transition performance penalty (e.g., the predetermined wait time is the system's "read to write" transition performance penalty when the current command is a read command, and the predetermined wait time is the system's "write to read" transition performance penalty when the current command is a write command). In embodiments that employ the preferred wait time, when the wait time has expired, the choice between an access request of a matching type and an access request of a mismatching type will be performance neutral. Typically, a "read to write" or "write to read" crossover is allowed immediately after expiration of a wait period, but not during the wait period (to limit the frequency at which crossovers can occur).

In some preferred embodiments, the arbiter of the invention is programmable or otherwise implemented to be operable in any of multiple operating modes. For example, it can have separately programmable wait times for "read to write" and "write to read" situations. For another example, the arbiter operates in a conventional manner (i.e., with the predetermined "wait time" equal to zero) before the first "read to write" or "write to read" transition (the first "crossover") in the sequence of "current clients," and after the first crossover the arbiter operates in accordance with the invention. For another example, the arbiter operates in a "pre-wait" mode in a conventional manner (i.e., with predetermined "wait time" equal to zero) before the first crossover in the sequence of "current clients," then (after the first crossover) operates in a "wait" mode in accordance with the invention (with nonzero wait time) for a predetermined time interval, then (after the predetermined time interval) operates in a "post-wait" mode in a conventional manner (with zero wait time) until the next crossover in the sequence of current clients, then operates again in the "pre-wait" mode, and so on in a repeating sequence of operating modes. Variations on the exemplary operating mode sequences are contemplated.

DETAILED DESCRIPTION OF THE PREFERRED EMBODIMENT

Figure 1:
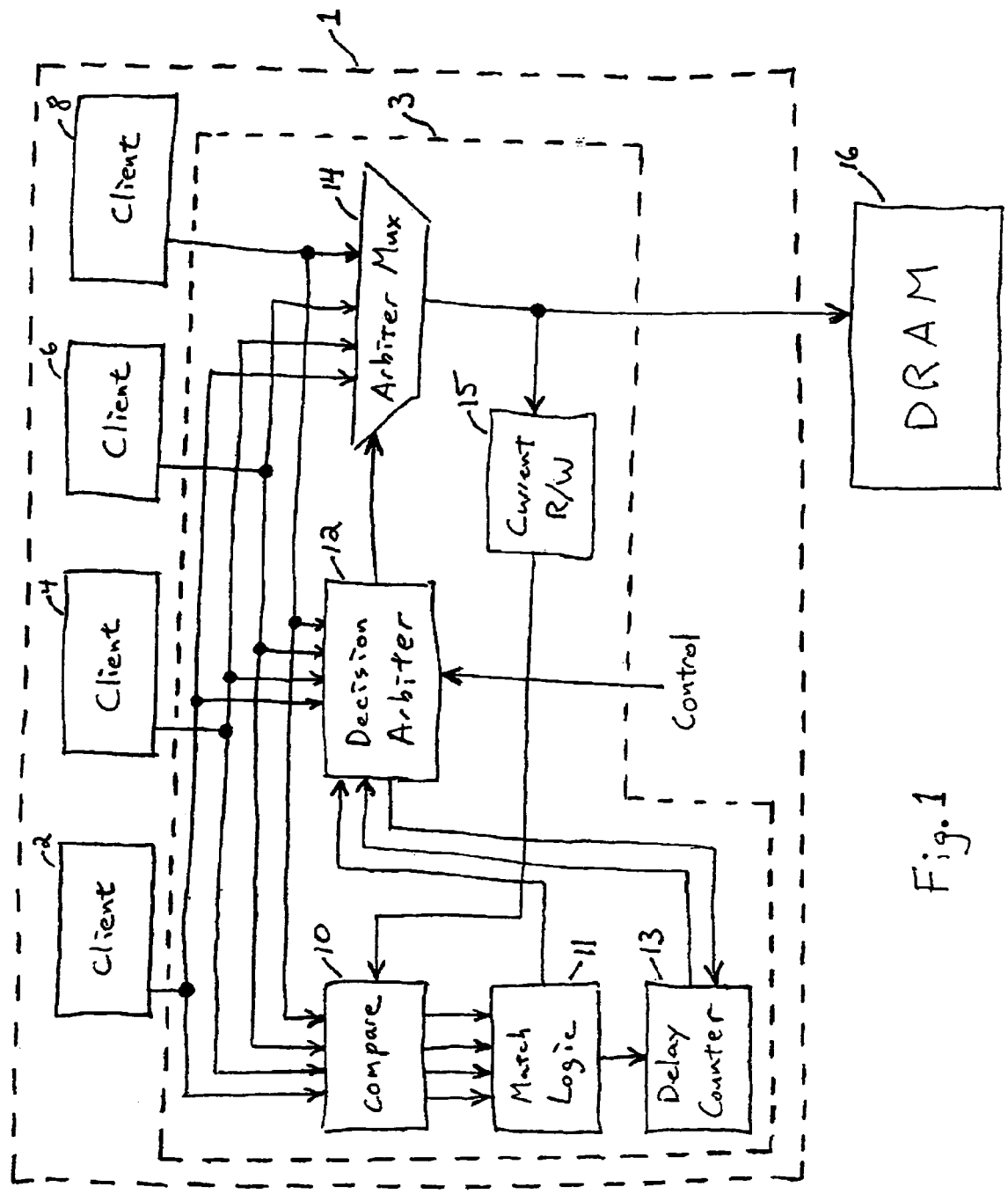
FIG. 1 is a block diagram of a system that embodies the invention.

A system that embodies the invention will be described with reference to FIG. 1. Integrated circuit 1 of FIG. 1 is a graphics processing chip which, in typical implementations, includes numerous components (not shown) in addition to those shown. The components of chip 1 that are shown in FIG. 1, and DRAM 16, comprise the inventive system. Chip 1 includes client devices ("clients") 2, 4, 6, and 8, and arbiter 3 (comprising elements 10, 11, 12, 13, 14, and 15) coupled between DRAM 16 and clients 2, 4, 6, and 8. Arbiter 3 comprises decision unit 12, multiplexer 14 (coupled to receive a control signal from unit 12), comparison logic 10, match determination logic 11, counter 13, and register 15. At any instant, each of clients 2, 4, 6, and 8 can assert a read or write command (for DRAM 16) to multiplexer 14, and a corresponding memory access request to decision unit 12 and comparison logic 10. Each memory access request includes a data structure (e.g., a bit) that identifies the request as a read access request or a write access request. Each read command includes an address from which data is to be read from DRAM 16, and each write command includes data to be written to DRAM and an address to which the data is to be written. Alternatively, DRAM 16 can reside, in whole or in part, on chip 1.

The term "node" is used herein to denote a point in system at which a signal that conveys information (e.g., a signal indicative of a command, sometimes referred to herein as a "command") can be received and through which the signal can propagate. For example, in an electric circuit implementation of chip 1 in which electrical potentials and/or voltages are indicative of information, an example of a node is a conductor (e.g., a metal interconnect or external pad) of chip 1 across which there is no more than a negligible voltage drop and whose potential is determined by at least one other element of chip 1 and/or at least one element external to chip 1.

Decision unit 12 is operable to select among competing ones of clients 2, 4, 6, and 8 in response to the count value from counter 13, and to assert to multiplexer 14 a control signal causing multiplexer 14 to pass (to DRAM 16) the read or write command from each selected client. In response to each read command passed through by multiplexer 14, DRAM 16 reads a stored value from the relevant address and asserts such value on a unidirectional bus. In response to each write command passed through by multiplexer 14, data is written to the location in DRAM 16 identified by the relevant address.

The client whose command has most recently been passed through to DRAM 16 is the "current" client. The command most recently passed through multiplexer 14 (the "current command") includes a data structure that identifies it as a read command or a write command, and this data structure is held in register 15 (and asserted to comparison logic 10).

At any instant, the state of comparison logic 10 is determined by each memory access request being asserted by clients 2, 4, 6, and 8, and by the data structure held in register 15. The output of logic 10 is asserted to match determination logic 11, and is indicative of whether each access request being asserted by clients 2, 4, 6, and 8 (and thus each command being asserted to multiplexer 14 by clients 2, 4, 6, and 8) is of the same read/write type as the current command. Each output signal asserted by match determination logic unit 11 indicates whether any of the commands being asserted by clients 2, 4, 6, and 8 is of the same read/write type as the current command.

In response to output from logic unit 11 indicating that none of the commands being asserted by clients 2, 4, 6, and 8 is of the same read/write type as the current command, unit 12 enters the inventive "wait" mode of operation and asserts to counter 13 either a first command (if the current command is a read command) or a second command (if the current command is a write command).

In response to the first command, counter 13 asserts a "block write" signal to unit 12 and increases (or decreases) a count value once per clock cycle from an initial value (e.g., zero). When the count value matches a first predetermined threshold value, counter 13 de-asserts the block write signal. Upon de-assertion of the block write signal, the count value is reset to the initial value.

In response to the second command, counter 13 asserts a "block read" signal to unit 12 and increases (or decreases) the count value once per clock cycle from the initial value. When the count value matches a second predetermined threshold value (which can but need not equal the first predetermined threshold value), counter 13 de-asserts the block read signal. Upon de-assertion of the block read signal, the count value is reset to the initial value.

Preferably, decision unit 12 is programmable and can be programmed to operate in any of a number of different arbitration modes in response to control data (e.g., control data from a source external to chip 1).

In one such arbitration mode (to be described with reference to FIG. 2), unit 12 operates in a repeating sequence of a "pre-wait" state (a "pre-wait" operating mode), followed by a "wait" state, followed by a "post-wait" state. Initially (e.g., after selection of an initial command as a current command), the system enters the "pre-wait" state (labeled "State 0" in FIG. 2). In this state, when the output of logic unit 11 indicates that at least one command being asserted by one of clients 2, 4, 6, and 8 is a "matching request" (a command of the same read/write type as the current command), unit 12 causes multiplexer 14 to select (pass through) one such matching request. When no command is asserted to the system in the pre-wait state, the system remains in the pre-wait state. When the output of logic unit 11 indicates that none of the commands being asserted by clients 2, 4, 6, and 8 (to the system in the pre-wait state) is of the same read/write type as the current command, the system enters the "wait" state (labeled "State 1" in FIG. 2).

Upon entry into the wait state, unit 12 causes counter 13 to assert either a block read or block write signal to unit 12 as described above. The system remains in the wait state for a predetermined time period (i.e., the period during which the count value increases or decreases from its initial value to the above-mentioned first or second predetermined threshold value), until a "timeout" event (at the end of such predetermined period) when the system enters the "post-wait" state (labeled "State 2" in FIG. 2). In the wait state, each time that the output of logic unit 11 indicates that at least one command being asserted by one of clients 2, 4, 6, and 8 is a "matching request" (a command of the same read/write type as the current command), unit 12 causes multiplexer 14 to select (pass through) one such matching request. In the wait state, whenever the output of logic unit 11 indicates that none of the commands being asserted by clients 2, 4, 6, and 8 is of the same read/write type as the current command, unit 12 prevents multiplexer 14 from selecting any of these commands and the system remains in the "wait" state.

Upon entry into the post-wait state, each time that the output of logic unit 11 indicates that at least one command being asserted by one of clients 2, 4, 6, and 8 is a "matching request," unit 12 causes multiplexer 14 to select one such matching request. When no command is asserted to the system in the post-wait state, the system remains in the post-wait state. When the output of logic unit 11 indicates that none of the commands being asserted by clients 2, 4, 6, and 8 (to the system in the post-wait state) is of the same read/write type as the current command, unit 12 causes multiplexer 14 to select one such command (the system accepts a "non-matching" request), and the system re-enters the "pre-wait" state.

Figure 2:
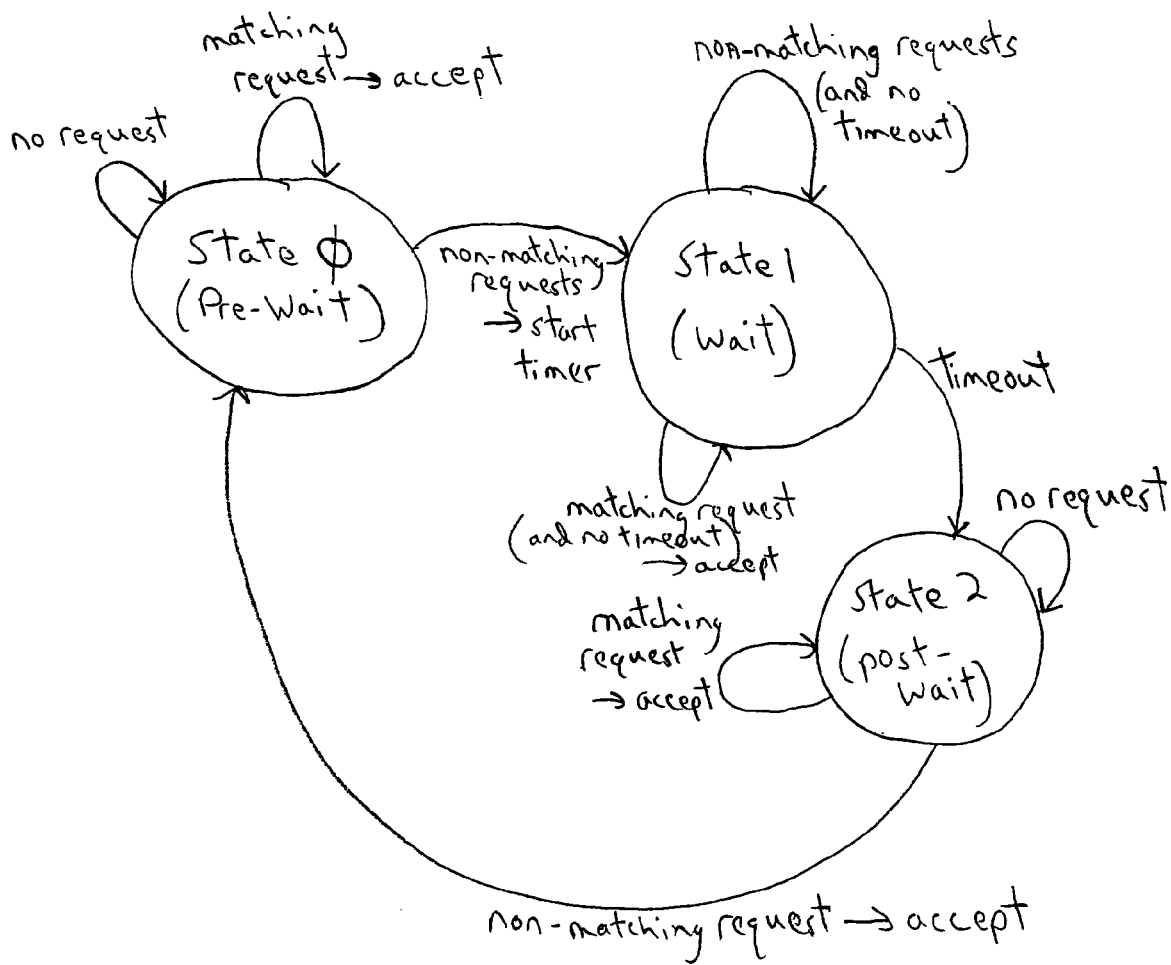
FIG. 2 is a state diagram for a class of embodiments of the inventive method.

Numerous variations on the arbitration mode described with reference to FIG. 2 are contemplated. For example, in one class of variations, each of the first N times (where N is a programmable number) that the system exits State 2 (the post-wait state), it re-enters State 1 (the wait state). Then, when the system exits State 2 for the (N+1)th time, it returns to State 0.

In another arbitration mode, decision unit 12 of FIG. 1 operates as follows:

when a current command has been selected, unit 12 enters a first state in which it applies at least one arbitration rule to select one of each set of commands asserted to the inputs of multiplexer 14 and cause multiplexer to pass the selected command (which can be a "non-matching" command, of the opposite read/write type as the current command) to DRAM 16. Upon selecting a non-matching command (from a set of commands at the inputs of multiplexer 14), unit 12 enters a wait state;

in the case that the non-matching command is a read command, unit 12 in the wait state responds to each set of write commands at the inputs of multiplexer 14 by preventing each of the write commands from being passed through to the output of multiplexer 14; and in the case that the non-matching command is a write command, unit 12 in the wait state responds to each set of read commands at the inputs of multiplexer 14 by preventing each of the read commands from being passed through to the output of multiplexer 14.

Typically, unit 12 operates in the wait state during a limited time interval (e.g. a time interval whose duration does not exceed a predetermined wait time), and exits the wait state upon the occurrence of one or more predetermined events (e.g., upon the elapse of the predetermined wait time after entering the wait state).

In another arbitration mode, decision unit 12 of FIG. 1 operates as follows:

when a current command has been selected, unit 12 enters a "normal" state in which, when logic unit 11's output undergoes a transition to a value indicating that at least one command being asserted by clients 2, 4, 6, and 8 (to the inputs of multiplexer 14) is of the same read/write type as the current command, unit 12 selects (as the next command) one of the commands that is of the same read/write type as the current command, and asserts a signal to multiplexer 14 causing multiplexer 14 to pass through the selected command. Unit 12 remains in the normal state if no command is asserted by any of the clients to the inputs of multiplexer 14. In the normal state, when logic unit 1 1's output undergoes a transition to a value indicating that at least one command is being contemporaneously asserted by clients 2, 4, 6, and 8 (to the inputs of multiplexer 14) but none of these commands is of the same read/write type as the current command, unit 12 enters a wait state; and upon entering the wait state, unit 12 asserts a command to counter 13 causing counter 13 to assert to unit 12 either a block read signal or block write signal (of the type described above) for a predetermined wait interval (or "wait time") until the count value within counter 13 matches a predetermined threshold value (or until the count value is reset). In the wait state, unit 12 monitors the output of logic unit 11, and when the output of unit 11 indicates that at least one command being asserted by clients 2, 4, 6, and 8 to the inputs of multiplexer 14 is of the same read/write type as the current command, unit 12 immediately selects (as the next command) a command being asserted to the inputs of multiplexer 14 that is of the same read/write type as the current command (e.g., unit 12 immediately selects one of multiple commands of the same read/write type as the current command that are contemporaneously asserted to the inputs of multiplexer 14), unit 12 asserts a signal to multiplexer 14 causing multiplexer 14 to pass through the selected command, and unit 12 resets counter 13 and immediately re-enters the normal state. In the wait state, when the output of logic unit 11 indicates that at least one command is being asserted to the inputs of multiplexer 14 but that no such command is of the same read/write type as the current command, unit 12 prevents multiplexer 14 from selecting any of the commands being asserted and the system remains in the "wait" state. At the end of the wait interval, unit 12 enters a third state in which it can select (as the next command) a command of the opposite read/write type as the current command. Unit 12 returns to the "normal" state after selecting a next command during "third" state operation. When unit 12 has returned to the normal state, the "next command" selected during "third" state operation becomes the current command for purposes of normal state operation, and the cycle can repeat.

In this manner, before switching from a first type of command to a second type of command (i.e. switching from read to write, or from write to read) due to no pending commands of the first type, a wait interval is used to temporarily prevent commands of the second type from reaching the DRAM, and, any commands of the first type that are received during the wait period are sent to the DRAM. Furthermore, it is preferable to not switch to sending commands of the second type until after the following two conditions have been met: (1) the wait interval has expired; and (2) there are no pending commands of the first type waiting to be sent to the DRAM.

Typically, the wait interval is a predetermined, small number of clock cycles. Preferably, the wait interval's duration matches the typical read/write turnaround penalty for the particular implementation of DRAM 16 being employed.

If the wait interval is too long, DRAM 16 may be inactive for an undesirably long time if no matching client becomes active (i.e., if none of clients 2, 4, 6, and 8 asserts to multiplexer 14 a command of the same read/write type as the current command) soon after the start of the wait interval. This can result in a performance penalty greater than the read/write turnaround penalty.

If the wait interval is not long enough, an opportunity can be missed in which a matching client becomes active just after (e.g., on the next clock after) the wait interval ends and a non-matching client is selected as the next client (resulting in a read/write turnaround penalty). For these reasons, the wait interval is preferably equal (or substantially equal) to the "read to write" or "write to read" performance penalty of DRAM 16 (e.g., the wait interval is the "read to write" performance penalty when the current command is a read command, and the wait interval is the "write to read" performance penalty when the current command is a write command). Typically, unit 12 allows a "read to write" or "write to read" crossover to occur immediately after expiration of a wait interval, but not during the wait interval (to limit the frequency at which crossovers can occur).

In alternate embodiments, potential page fault conditions are taken into account. In most DRAMs, the occurrence of a page fault is a greater performance penalty than bus turnaround. This means, for example, a series of read operations to the same page in DRAM is preferably followed by a write operation to the same page rather than by a read operation (i.e., an operation of the same R/W type) that causes a page fault. The decision arbiter 12 can look for potential page fault conditions and choose operations that do not cause page faults over operations that do cause page faults. In addition, a list of open pages is maintained to accommodate DRAMs (or an array of DRAMs) that include multiple banks. Maintaining this list provides: (a) detection of read and write operations that would cause a page fault, detected when the page accessed by the operation is not in the open page list; and (b) detection of an operation of a different R/W type that is accessing an open page. At least a portion of the addresses (e.g., the page portion of each address) associated with the operations are compared to information stored in the open page table. In some embodiments, the arbiter preferentially performs one or more of the following: (a) skip the wait interval and change the R/W type when all pending operations of the same R/W type as the current R/W type cause a page fault; and (b) skip the wait interval when there are no pending operations that match the current R/W type and all pending operations would cause a page fault.

In embodiments in which the DRAM comprises multiple banks, the arbiter may inject commands to the DRAM that close pages and prepare for an operation to a different page.

Unit 12 (or more generally, the arbiter of the invention) is preferably programmable or otherwise implemented to be operable in any of multiple operating modes. For example, it can have separately programmable wait intervals for "read to write" situations (in which the current command is a read command) and "write to read" situations (in which the current command is a write command). For another example, unit 12 can be configured to operate in a conventional manner (i.e., with "wait time" equal to zero, in a mode in which it applies a conventional rule set to select among competing access requests from clients 2, 4, 6, and 8) before the first "read to write" or "write to read" transition (the first "crossover") in the sequence of current clients, and after the first crossover to operate in a "wait" mode in accordance with the invention (with a nonzero wait time).

Another aspect of the invention is an arbiter (e.g., arbiter 3 comprising elements 10, 11, 12, 13, 14, and 15 of FIG. 1) suitable for use in implementing any embodiment of the inventive system.

Another embodiment of the invention is a method for arbitrating multiple memory access commands for a memory (e.g., a DRAM), including the steps of:

(a) asserting a current command to the memory; and (b) after step (a), responding to a homogeneous set of the commands by preventing each command in the homogeneous set from reaching the memory, wherein the homogeneous set includes at least one of the commands but no command of the same read/write type as the current command.

Step (b) can include the step of responding to each homogeneous set of at least one of the commands, that is asserted during a limited time interval (whose duration can be equal to, or less than or equal to a predetermtined duration) and includes no command of the same read/write type as the current command, by preventing each command in said each homogeneous set from reaching the memory. Optionally, the method also includes the step of responding to assertion during the limited time interval of at least one matching set of the commands by passing, to the memory, one command of the same read/write type as the current command of each said at least one matching set, wherein each said matching set includes at least one command of the same read/write type as the current command.

Another embodiment of the invention is a method for arbitrating among commands asserted by clients for access to a memory (e.g., a DRAM) at a time when a current client has been selected. The method includes the steps of:

in response to a set of competing ones of the clients that includes at least one client of the same read/write type as the current client, selecting (as the next client) one of the clients in the set that is of the same read/write type as the current client; and in response to a set of competing ones of the clients that does not include any client of the same read/write type as the current client (such a set is sometimes referred to herein as a "homogenous" set, since it consists of clients that are asserting read requests if the current client is a write client, and consists of clients that are asserting write requests if the current client is a read client), operating in a wait mode (having a duration that does not exceed a predetermined duration and commencing at a first time), by selecting (as the next client) a client (if any) that asserts a command of the same read/write type as that of the current client and rejecting all other commands (if any), and after operating in the wait mode, operating in a second arbitration mode. For example, in the arbitration mode, a rule set (comprising at least one rule) can be applied to select as the next client one of a second set of the clients that are competing for access to the memory, even when the second set includes no client of the same read/write type as the current client.

Another embodiment of the invention is a method for arbitrating multiple memory access commands at a time when a current command has been asserted to a memory (e.g., a DRAM), said method including the steps of:

(a) operating initially in a first mode, including by responding to each asserted set of at least one of the commands that includes at least one command of the same read/write type as the current command by passing through to the memory one of the commands in the set that is of the same read/write type as the current command; and (b) when in the first mode, commencing operation in a wait mode in response to assertion of a homogeneous set of at least one of the commands that includes no command of the same read/write type as the current command, wherein the wait mode has duration that does not exceed a predetermined duration, no command of the same read/write type as the current command is passed through to the memory during operation in the wait mode, and operation in the wait mode includes the step of responding to a set of the commands that includes at least one command of the same read/write type as the current command by passing through to the memory a command in said set that is of the same read/write type as the current command.

It should be understood that while certain forms of the invention have been illustrated and described herein, the invention is not to be limited to the specific embodiments described and shown or the specific methods described. The claims that describe methods do not imply any specific order of steps unless explicitly described in the claim language.

What is claimed is:

1. A system for arbitrating memory access requests, said system including:

an arbiter;

a DRAM; and at least two clients, wherein the arbiter is coupled between the clients and the DRAM, the clients are configured to assert to the arbiter read and write commands for the DRAM, and the arbiter is operable to pass through to the DRAM selected ones of the commands, wherein the arbiter is configured to enter a first state upon passing a current command to the DRAM, the arbiter in the first state is configured to respond to assertion of each set of the commands that includes at least one command of the same read/write type as the current command by passing through to the DRAM a command in the set of the same read/write type as the current command, and the arbiter in the first state is configured to enter a wait state having duration that does not exceed a predetermined duration in response to assertion of a homogeneous set of at least one of the commands, wherein the homogeneous set includes no command of the same read/write type as the current command, the arbiter in the wait state prevents pass-through to the DRAM of any command that is not of the same read/write type as the current command, and the arbiter in the wait state responds to assertion of a set of the commands that includes at least one command of the same read/write type as the current command by passing through to the DRAM a command in the set of the same read/write type as the current command.

2. The system of claim 1, wherein the arbiter in the wait state is configured to return to the first state upon passing through to the DRAM a command of the same read/write type as the current command, and to return to the first state upon elapse of the predetermined duration after entry into the wait state if the arbiter has not by then passed through to the DRAM at least one command of the same read/write type as the current command.

3. The system of claim 1, wherein the duration of the wait state is said predetermined duration, and the arbiter in the wait state responds to assertion of each set of the commands that includes at least one command of the same read/write type as the current command by passing through to the DRAM a command of said each set that is of the same read/write type as the current command.

4. The system of claim 3, wherein the arbiter in the wait state is configured to return to the first state upon elapse of said predetermined duration after entry into the wait state.

5. The system of claim 3, wherein the arbiter in the wait state is configured to enter a third state upon elapse of said predetermined duration after entry into the wait state.

6. The system of claim 5, wherein the arbiter in the third state is configured to respond to assertion of at least one of the read and write commands by:

passing through to the DRAM a command in the set of the same read/write type as the current command if said set includes at least one command of the same read/write type as the current command, and passing through to the DRAM a command in the set that is not of the same read/write type as the current command if said set includes no command of the same read/write type as the current command.

7. The system of claim 5, wherein the arbiter in the third state is configured to respond to assertion of a set of at least one of the commands by:

passing through to the DRAM a command in the set of the same read/write type as the current command and then returning to the first state, if said set includes at least one command of the same read/write type as the current command, and passing through to the DRAM a command in the set that is not of the same read/write type as the current command and then returning to the first state, if said set includes no command of the same read/write type as the current command.

8. The system of claim 1, wherein at least the arbiter and the clients of said system are implemented as part of an integrated circuit.

9. The system of claim 1, wherein the DRAM is configured to operate in response to a clock, and the predetermined duration is a predetermined number of cycles of the clock.

10. The system of claim 1, wherein the DRAM has a read-to-write transition performance penalty and a write-to-read transition performance penalty, and the predetermined duration is at least substantially equal to at least one of the read-to-write transition performance penalty and the write-to-read transition performance penalty.

11. The system of claim 1, wherein the arbiter is operable in any one of a number of different arbitration states including the wait state, and the arbiter is configured to enter one of the arbitration states in response to at least one control signal.

12. The system of claim 1, wherein when the arbiter enters the wait state at a first time, the arbiter in the wait state is configured to enter a third state if no command of the same read/write type as the current command is asserted to the arbiter within a wait mode interval commencing at the first time and having said predetermined duration.

13. The system of claim 12, wherein the arbiter is configured to operate in the third state by applying a rule set to determine a selected command from a third set of at least one of the commands asserted thereto, and to pass through to the DRAM the selected command, wherein the selected command is not of the same read/write type as the current command when the third set includes no command of the same read/write type as the current command.

14. A system for arbitrating memory access requests, said system including:

an arbiter configured to monitor for occurrence of a potential page fault condition;

a DRAM; and at least two clients, wherein the arbiter is coupled between the clients and the DRAM, the clients are configured to assert to the arbiter read and write commands for the DRAM, and the arbiter is operable to pass through to the DRAM selected ones of the commands, wherein the arbiter is configured to enter a first state upon passing a current command to the DRAM, the arbiter in the first state is configured to respond to assertion of each set of the commands that includes at least one command of the same read/write type as the current command by passing through to the DRAM a command in the set of the same read/write type as the current command, and the arbiter in the first state is configured to enter a wait state having duration that does not exceed a predetermined duration in response to assertion of a homogeneous set of at least one of the commands, wherein the homogeneous set includes no command of the same read/write type as the current command, the arbiter in the wait state prevents pass-through to the DRAM of any command that is not of the same read/write type as the current command, and the arbiter in the wait state responds to assertion of a set of the commands that includes at least one command of the same read/write type as the current command, when no potential page fault condition has been identified, by passing through to the DRAM a command in the set of the same read/write type as the current command.

15. The system of claim 14, wherein the arbiter is configured to monitor for occurrence of a potential page fault condition by comparing at least a portion of addresses associated with the commands to information stored in an open page table.

16. The system of claim 14, wherein the arbiter is operable in any one of a number of different arbitration states including the wait state and the first state, and the arbiter is configured to enter one of the arbitration states other than the wait state in response to identifying one said potential page fault condition.

17. An arbiter for arbitrating among multiple read and write commands for a DRAM, said arbiter including:
input nodes to the DRAM configured to be coupled to receive sets of the commands;
at least one output node configured to be coupled to the DRAM to assert selected ones of the commands at the input nodes to said DRAM; and
circuitry, coupled between the input nodes and the at least one output node, and configured to enter a first state upon asserting a current command to the at least one output node, the circuitry in the first state is configured to respond to assertion at the input nodes of each set of the commands that includes at least one command of the same read/write type as the current command by asserting to the at least one output node a command in the set of the same read/write type as the current command, and
the circuitry in the first state is configured to enter a wait state having duration that does not exceed a predetermined duration in response to assertion at the input nodes of a homogeneous set of at least one of the commands, wherein the homogeneous set includes no command of the same read/write type as the current command, the circuitry in the wait state prevents assertion to the at least one output node of any command that is not of the same read/write type as the current command, and
the circuitry in the wait state responds to assertion at the input nodes of a set of the commands that includes at least one command of the same read/write type as the current command by asserting to the at least one output node a command in the set of the same read/write type as the current command.

18. The arbiter of claim 17, wherein the circuitry in the wait state is configured to return to the first state upon asserting to the at least one output node a command of the same read/write type as the current command, and to return to the first state upon elapse of the predetermined duration after entry into the wait state if the circuitry has not by then asserted to the at least one output node at least one command of the same read/write type as the current command.

19. The arbiter of claim 17, wherein the duration of the wait state is said predetermined duration, and the circuitry in the wait state responds to assertion at the input nodes of each set of the commands that includes at least one command of the same read/write type as the current command by asserting to the at least one output node a command of said each set that is of the same read/write type as the current command.

20. The arbiter of claim 19, wherein the circuitry in the wait state is configured to return to the first state upon elapse of said predetermined duration after entry into the wait state.

21. The arbiter of claim 19, wherein the circuitry in the wait state is configured to enter a third state upon elapse of said predetermined duration after entry into the wait state.

22. The arbiter of claim 21, wherein the circuitry in the third state is configured to respond to assertion at the input nodes of a set of at least one of the commands by:
asserting to the at least one output node a command in the set of the same read/write type as the current command if said set includes at least one command of the same read/write type as the current command, and
asserting to the at least one output node a command in the set that is not of the same read/write type as the current command if said set includes no command of the same read/write type as the current command.

23. The arbiter of claim 21, wherein the circuitry in the third state is configured to respond to assertion at the input nodes of a set of at least one of the commands by:
asserting to the at least one output node a command in the set of the same read/write type as the current command and then returning to the first state, if said set includes at least one command of the same read/write type as the current command, and
asserting to the at least one output node a command in the set that is not of the same read/write type as the current command and then returning to the first state, if said set includes no command of the same read/write type as the current command.

24. The arbiter of claim 17, wherein said arbiter is implemented as part of an integrated circuit.

25. The arbiter of claim 17, wherein the DRAM is operable in response to a clock, and the predetermined duration is a predetermined number of cycles of the clock.

26. The arbiter of claim 17, wherein the DRAM has a read-to-write transition performance penalty and a write-to-read transition performance penalty, and the predetermined duration is at least substantially equal to at least one of the read-to-write transition performance penalty and the write-to-read transition performance penalty.

27. The arbiter of claim 17, wherein the circuitry is configured to detect a potential page fault condition.

28. The arbiter of claim 17, wherein the circuitry is operable in any one of a number of different arbitration states including the wait state and the first state, and the circuitry is configured to enter one of the arbitration states in response to at least one control signal.

29. An arbiter for arbitrating among multiple read and write commands for a DRAM, said arbiter including:
input nodes configured to be coupled to receive sets of the commands;
at least one output node configured to be coupled to the DRAM to assert selected ones of the commands at the input nodes to said DRAM; and
circuitry, coupled between the input nodes and the at least one output node, and configured to detect a potential page fault status condition and to enter a first state upon asserting a current command to the at least one output node, the circuitry in the first state is configured to respond to assertion at the input nodes of each set of the commands that includes at least one command of the same read/write type as the current command by asserting to the at least one output node a command in the set of the same read/write type as the current command, and
the circuitry in the first state is configured to enter a wait state having duration that does not exceed a predetermined duration in response to assertion at the input nodes of a homogeneous set of at least one of the commands when no potential page fault condition has been identified, wherein the homogeneous set includes no command of the same read/write type as the current command, the circuitry in the wait state prevents assertion to the at least one output node of any command that is not of the same read/write type as the current command, and the circuitry in the wait state responds to assertion at the input nodes of a set of the commands that includes at least one command of the same read/write type as the current command by asserting to the at least one output node a command in the set of the same read/write type as the current command.

30. The arbiter of claim 29, wherein the circuitry is operable in any one of at least two arbitration states including the first state and the wait state, and the circuitry is configured to enter one of the arbitration states other than the wait state in response to identifying one said potential page fault condition.

31. A method for arbitrating multiple memory access commands at a time when a current command has been asserted to a DRAM, said method including the steps of:

(a) operating initially in a first mode, including by responding to each asserted set of at least one of the commands that includes at least one command of the same read/write type as the current command by passing through to the DRAM one of the commands in the set that is of the same read/write type as the current command; and (b) when in the first mode, commencing operation in a wait mode in response to assertion of a homogeneous set of at least one of the commands that includes no command of the same read/write type as the current command, wherein the wait mode has duration that does not exceed a predetermined duration, no command of the same read/write type as the current command is passed through to the DRAM during operation in the wait mode, and operation in the wait mode includes the step of responding to a set of the commands that includes at least one command of the same read/write type as the current command by passing through to the DRAM a command in said set that is of the same read/write type as the current command.

32. The method of claim 31, also including the steps of:

(c) after passing through to the DRAM any command of the same read/write type as the current command during operation in the wait mode, resuming operation in the first mode; and (d) if no command of the same read/write type as the current command has been passed through to the DRAM during operation in the wait mode upon elapse of said predetermined duration after commencing operation in the wait mode, resuming operation in the first mode.

33. The method of claim 31, wherein operation in the wait mode continues for the predetermined duration and includes the step of responding to assertion of each set of the commands that includes at least one command of the same read/write type as the current command by passing through to the DRAM a command of said each set that is of the same read/write type as the current command.

34. The method of claim 33, also including the step of:

(c) resuming operation in the first mode upon elapse of said predetermined duration after commencing operation in the wait mode.

35. The method of claim 33, also Including the step of:

(c) operating in a third mode upon elapse of said predetermined duration after commencing operation in the wait mode.

36. The method of claim 35, wherein operation in the third mode includes the step of:

(d) responding to assertion of a set of at least one of the commands by passing through to the DRAIVI a command in the set of the same read/write type as the current command if said set includes at least one command of the same read/write type as the current command, and passing through to the DRAM a command in the set that is not of the same read/write type as the current command if said set includes no command of the same read/write type as the current command.

37. The method of claim 35, wherein operation in the third mode includes the step of:

(d) responding to assertion of a set of at least one of the commands by passing through to the DRAM a command in the set of the same read/write type as the current command and then resuming operation in the first mode, if said set includes at least one command of the same read/write type as the current command, and passing through to the DRAM a command in the set that is not of the same read/write type as the current command and then resuming operation in the first mode, if said set includes no command of the same 10 read/write type as the current command.

38. The method of claim 31, wherein the DRAM operates in response to a clock, and the predetermined duration is a predetermined number of cycles of the clock.

39. The method of claim 31, also including the step of monitoring for occurrence of a potential page fault condition, and wherein step (b) is performed in a manner determined at least in part by a result of said monitoring.

40. The method of claim 31, wherein the DRAM has a read-to-write transition performance penalty and a write-to-read transition performance penalty, and the predetermined duration is at least substantially equal to at least one of the read-to-write transition performance penalty and the write-to-read transition performance penalty.

* * * * *